(12) United States Patent
Holcman et al.

(10) Patent No.: US 9,185,654 B2
(45) Date of Patent: Nov. 10, 2015

(54) NETWORK SERVER HAVING AN INFORMATION AND SCHEDULING CONTROLLER TO SUPPORT ONE OR MORE LOW DUTY CYCLE WIRELESS DEVICES

(75) Inventors: Alejandro R. Holcman, San Diego, CA (US); Babak Aryan, San Diego, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 659 days.

(21) Appl. No.: 12/463,208

(22) Filed: May 8, 2009

(65) Prior Publication Data

US 2010/0015916 A1 Jan. 21, 2010

Related U.S. Application Data

(60) Provisional application No. 61/081,330, filed on Jul. 16, 2008.

(51) Int. Cl.
*H04W 24/00* (2009.01)
*H04W 52/02* (2009.01)
*H04W 64/00* (2009.01)

(52) U.S. Cl.
CPC ........ *H04W 52/0235* (2013.01); *H04W 64/003* (2013.01)

(58) Field of Classification Search
USPC .............. 455/456.5, 432.1, 39; 370/331, 350, 370/503; 340/7.32
See application file for complete search history.

(56) References Cited

U.S. PATENT DOCUMENTS

| 5,276,703 | A | 1/1994 | Budin et al. |
| 5,748,103 | A * | 5/1998 | Flach et al. ............... 340/870.07 |
| 5,748,104 | A | 5/1998 | Argyroudis et al. |
| 5,797,094 | A | 8/1998 | Houde et al. |
| 6,154,500 | A | 11/2000 | Dorenbosch et al. |
| 6,397,053 | B1 | 5/2002 | Ghiazza |
| 6,449,491 | B1 | 9/2002 | Dailey |
| 6,463,307 | B1 * | 10/2002 | Larsson et al. ................ 455/574 |
| 6,480,476 | B1 * | 11/2002 | Willars ......................... 370/311 |

(Continued)

FOREIGN PATENT DOCUMENTS

| CA | 2433110 C | 6/2004 |
| CN | 1323495 A | 11/2001 |

(Continued)

OTHER PUBLICATIONS

Written Opinion, PCT/US2007/071808, International Searching Authority, European Patent Office, Jan. 7, 2008.

(Continued)

*Primary Examiner* — Nimesh Patel
(74) *Attorney, Agent, or Firm* — Shyam K. Parekh; Thomas A. Jolly

(57) ABSTRACT

A network server, such as, for example, a mobile positioning center, having an information or schedule controller or having access to an information or schedule controller is provided. The information or schedule controller is provided with a schedule for a low duty cycle wireless device to provide the network server with the ability to store messages for transmission to the low duty cycle wireless device when the low duty cycle wireless device is in a low power mode of operation and transmit the messages during scheduled awake times.

40 Claims, 4 Drawing Sheets

(56) References Cited

U.S. PATENT DOCUMENTS

| | | |
|---|---|---|
| 6,490,446 B1 | 12/2002 | Haartsen |
| 6,687,501 B2 | 2/2004 | Soliman |
| 7,027,425 B1 | 4/2006 | Fullerton et al. |
| 7,027,796 B1 | 4/2006 | Linsky et al. |
| 7,047,051 B2 | 5/2006 | Sackett et al. |
| 7,301,477 B2 | 11/2007 | Isoyama et al. |
| 7,319,867 B2 | 1/2008 | Li |
| 7,386,299 B2 | 6/2008 | Nakamura |
| 7,394,782 B2 * | 7/2008 | Davis .......................... 370/324 |
| 7,412,265 B2 | 8/2008 | Chen et al. |
| 7,457,973 B2 | 11/2008 | Liu |
| 7,466,665 B2 | 12/2008 | Calcev et al. |
| 7,508,781 B2 | 3/2009 | Liu et al. |
| 7,558,605 B2 | 7/2009 | Lee et al. |
| 7,565,181 B1 | 7/2009 | Hans et al. |
| 7,747,258 B2 | 6/2010 | Farmer |
| 7,945,234 B2 | 5/2011 | Lee et al. |
| 8,443,083 B2 | 5/2013 | Khushu et al. |
| 8,509,859 B2 | 8/2013 | Jarosinski et al. |
| 2001/0027378 A1 | 10/2001 | Tennison et al. |
| 2002/0016190 A1 | 2/2002 | Higuchi et al. |
| 2002/0058528 A1 | 5/2002 | Hunzinger |
| 2003/0109268 A1 | 6/2003 | Fraser et al. |
| 2003/0148800 A1 | 8/2003 | Lee |
| 2003/0227382 A1 | 12/2003 | Breed |
| 2004/0024879 A1 | 2/2004 | Dingman et al. |
| 2004/0174270 A1 | 9/2004 | Choi |
| 2004/0218556 A1 * | 11/2004 | Son et al. ....................... 370/311 |
| 2004/0225892 A1 * | 11/2004 | Bear et al. ..................... 713/200 |
| 2005/0054389 A1 | 3/2005 | Lee et al. |
| 2005/0055418 A1 | 3/2005 | Blanc et al. |
| 2005/0060089 A1 | 3/2005 | Garin et al. |
| 2005/0108589 A1 * | 5/2005 | Kadatch et al. ............... 713/330 |
| 2005/0129009 A1 | 6/2005 | Kitchin |
| 2005/0190723 A1 | 9/2005 | Rao et al. |
| 2005/0197125 A1 | 9/2005 | Kang et al. |
| 2006/0025181 A1 * | 2/2006 | Kalofonos et al. ............ 455/574 |
| 2006/0068750 A1 | 3/2006 | Burr |
| 2006/0111825 A1 | 5/2006 | Okada et al. |
| 2006/0120303 A1 | 6/2006 | Yarvis et al. |
| 2006/0120314 A1 | 6/2006 | Krantz et al. |
| 2006/0223454 A1 | 10/2006 | Westwick et al. |
| 2006/0280140 A9 | 12/2006 | Mahany et al. |
| 2007/0008916 A1 | 1/2007 | Haugli et al. |
| 2007/0053315 A1 | 3/2007 | Sugaya |
| 2007/0057767 A1 * | 3/2007 | Sun et al. ....................... 340/7.35 |
| 2007/0116033 A1 | 5/2007 | Reunamaki et al. |
| 2007/0127425 A1 | 6/2007 | Keidar et al. |
| 2007/0127435 A1 | 6/2007 | Antony et al. |
| 2007/0132751 A1 | 6/2007 | Claessen |
| 2007/0150599 A1 | 6/2007 | Neogi et al. |
| 2007/0153876 A1 | 7/2007 | Pi et al. |
| 2007/0248057 A1 * | 10/2007 | Keidar et al. ................. 370/337 |
| 2007/0274244 A1 | 11/2007 | Yoon et al. |
| 2007/0291673 A1 | 12/2007 | Demirhan et al. |
| 2008/0008510 A1 * | 1/2008 | Lee et al. ....................... 399/411 |
| 2008/0049700 A1 | 2/2008 | Shah et al. |
| 2008/0242313 A1 | 10/2008 | Lee et al. |
| 2009/0129325 A1 | 5/2009 | Prakash et al. |
| 2010/0015916 A1 * | 1/2010 | Holcman et al. ................ 455/39 |
| 2012/0002574 A1 | 1/2012 | Lee et al. |
| 2012/0257563 A1 | 10/2012 | Sinnarajah et al. |
| 2014/0071859 A1 | 3/2014 | Lee et al. |
| 2014/0148159 A1 | 5/2014 | Lee et al. |

FOREIGN PATENT DOCUMENTS

| | | |
|---|---|---|
| CN | 1464753 A | 12/2003 |
| CN | 1592292 A | 3/2005 |
| CN | 1740949 A | 3/2006 |
| CN | 1930793 A | 3/2007 |
| CN | 1933672 A | 3/2007 |
| CN | 101171755 A | 4/2008 |
| CN | 101194232 A | 6/2008 |
| EP | 1158685 | 10/2002 |
| JP | 1286528 | 11/1989 |
| JP | H1063979 A | 3/1998 |
| JP | 10094053 A | 4/1998 |
| JP | 10191424 | 7/1998 |
| JP | 10290193 A | 10/1998 |
| JP | 1175261 | 3/1999 |
| JP | 11313370 A | 11/1999 |
| JP | 2000078305 A | 3/2000 |
| JP | 2001357483 A | 12/2001 |
| JP | 2002544635 A | 12/2002 |
| JP | 2003516681 A | 5/2003 |
| JP | 2003244164 A | 8/2003 |
| JP | 2004040812 A | 2/2004 |
| JP | 2004185459 A | 7/2004 |
| JP | 2005135289 A | 5/2005 |
| JP | 2005328230 A | 11/2005 |
| JP | 2005535901 T | 11/2005 |
| JP | 2006513644 A | 4/2006 |
| JP | 2006174328 A | 6/2006 |
| JP | 2006254317 A | 9/2006 |
| JP | 2006270296 A | 10/2006 |
| JP | 2007067829 A | 3/2007 |
| JP | 2007507150 A | 3/2007 |
| RU | 2181229 C1 | 4/2002 |
| TW | 235564 B | 7/2005 |
| WO | WO9619084 A1 | 6/1996 |
| WO | 9718639 | 5/1997 |
| WO | WO9927465 A1 | 6/1999 |
| WO | WO0010353 A1 | 2/2000 |
| WO | 0070572 A1 | 11/2000 |
| WO | WO0128274 A1 | 4/2001 |
| WO | WO-02031989 | 4/2002 |
| WO | WO02080483 A1 | 10/2002 |
| WO | WO-2004017092 A1 | 2/2004 |
| WO | WO2004066564 A1 | 8/2004 |
| WO | WO2005032176 A1 | 4/2005 |
| WO | 2005096516 A1 | 10/2005 |
| WO | WO2006115577 A1 | 11/2006 |
| WO | WO-2006119471 A2 | 11/2006 |
| WO | WO2007149993 | 12/2007 |

OTHER PUBLICATIONS

International Preliminary Report on Patentability, PCT/US2007/071808, The International Bureau of WIPO, Geneva, Switzerland, Dec. 22, 2008.

International Search Report—PCT/US08/052224, International Search Authority, European Patent Office—Rijswijk—Jun. 11, 2008.

Written Opinion, PCT/US08/052224, International Searching Authority, European Patent Office, Rijswijk, Jun. 11, 2008.

International Search Report and Written Opinion—PCT/US2009/050874, International Search Authority—European Patent Office—Nov. 9, 2009.

Taiwan Search Report—TW098124103—TIPO—Sep. 3, 2012.

Panchabhai A M et al., "A Node Hibernation Protocol utilizing multiple transmit power levels for wireless sensor networks", Vehicular Technology Conference, 2004. VTC2004-Fall. 2004 IEEE 60th, IEEE, Sep. 29, 2004, vol. 4, pp. 2808-2813.

Ramanathan N et al., "A Stream-Oriented Power Management Protocol for Low Duty Cycle Sensor Network Applications", Embedded Networked Sensors, 2005. EmNetS-II. The Second IEEE Workshop on,IEEE,May 31, 2005,p. 53-62.

* cited by examiner

NETWORK SERVER HAVING AN INFORMATION AND SCHEDULING CONTROLLER TO SUPPORT ONE OR MORE LOW DUTY CYCLE WIRELESS DEVICES

RELATED APPLICATIONS

This patent application claims benefit of and priority to U.S. Provisional Patent Application 61/081,330, filed Jul. 16, 2008, and titled "NETWORK SERVER HAVING AN INFORMATION AND SCHEDULING CONTROLLER TO SUPPORT ONE OR MORE LOW DUTY CYCLE WIRELESS DEVICES", and which is incorporated in its entirety by reference herein.

REFERENCE TO CO-PENDING APPLICATIONS FOR PATENT

The present application for patent is related to the following co-pending U.S. patent applications:

"LOW DUTY CYCLE DEVICE PROTOCOL" by Chong Lee et al., identified by U.S. patent application Ser. No. 12/020,389, filed Jan. 25, 2008, assigned to the assignee hereof, and expressly incorporated by reference herein; and "LOW DUTY CYCLE NETWORK CONTROLLER" by Chong Lee et al., identified by U.S. patent application Ser. No. 11/766,068, filed Jun. 20, 2007, assigned to the assignee hereof, and expressly incorporated by reference herein.

BACKGROUND

1. Field

The technology of the present application relates generally to wireless devices or terminals having extended hibernation or low duty cycles, and more specifically to a mobile positioning center or network server having an information or schedule controller to support wireless devices or terminals having extended hibernation or low duty cycles.

2. Background

The ability of wireless devices or terminals to access and use location and/or position based services is becoming ubiquitous. Some applications in fact require the location or position of the wireless device or terminal. For example, the adoption of enhanced 911 services in North America requires the position or location of a wireless device to be provided to a Public Safety Answering Point (PSAP) when an emergency response call is made (i.e., a 911 call).

In some instances remotely located, battery operated wireless devices or terminals are used to monitor the operational status information of equipment and transmit the information to a more centrally located information processing device or center. To facilitate long term operation of these devices, it is desirous to place the battery operated wireless device into a "sleep" or low power operational mode to conserve battery power for a majority of the time and only provide sufficient battery power during periods when the wireless device actually needs to function. For example, a radio frequency identification unit for a container of cargo on a ship may only need to transmit location once an hour, once a day, or the like. Other uses may have different operational needs and time frames.

To extend battery life, the above referenced co-owned patent applications disclose, among other things, a low duty cycle controller and a low duty cycle device. The low duty cycle controller maintains synchronization between the low duty cycle controller and one or more low duty cycle devices operating over a communications network. The synchronization is maintained separate from the protocol and timing of the communication network. The low duty cycle device operates with an extended hibernation mode inhibiting the transmission, reception, and processing of signals.

While the low duty cycle controller and device are useful, many position and/or location base services use a mobile positioning center and position determining equipment to generate the actual position or location of the device. Moreover, other network based servers may be required to send or receive messages and transmissions from devices. Currently, the mobile positioning centers, the associated position determining equipment, or various other associated network servers and applications do not currently incorporate an ability to effectively communicate with a low duty cycle device. Thus, it would be desirous to provide a mobile positioning center, other network server, or the like that has the ability to support a low duty cycle device.

SUMMARY

Embodiments of the technology of the present application disclosed herein address the above stated needs by providing a network server with or access to an information or schedule controller. The network server includes at least one network interface to couple the network server to a base station. A processor coupled to the at least one network interface is adapted to receive and transmit signals to at least one low duty cycle wireless device through the base station. An information or schedule controller is adapted to provide information to the processor about when the low duty cycle wireless device is awake, wherein the network server is adapted to transmit information over a wireless network via the base station to the low duty cycle wireless device when the low duty cycle wireless device awakes from a hibernation mode.

Other embodiments of the technology of the present application disclosed herein address the above stated needs by providing methods to transmit and receive messages at a network server from and to a low duty cycle wireless device. The method includes scheduling an awake time for the at least one low duty cycle wireless device. The network server stores messages to be transmitted to the at least one low duty cycle wireless device for transmission during the awake time. The at least one low duty cycle wireless device is woken during the scheduled awake time and the network server transmits the stored messages for the at least one low duty cycle wireless device.

Yet other embodiments of the technology of the present application disclosed herein address the above stated needs by providing computer program products containing computer executable code stored on a computer readable storage medium that cause a computer to schedule an awake time for at least one low duty cycle wireless device. The executable code also causes the computer to store messages for the at least one low duty cycle wireless device for transmission during the awake time and transmit the stored messages for the at least one low duty cycle wireless device during the scheduled awake time such that the at least one low duty cycle wireless device may be have an extended hibernation mode.

Still other embodiments of the technology of the present application disclosed herein address the above stated needs by providing a network server with means for connecting the network server to a base station and means for transmitting signals to and receiving signals from a low duty cycle wireless device through the base station. The network server also includes means for scheduling the transmission to the low duty cycle wireless device to synchronize the transmission of signals with a time when the low duty cycle wireless device is awake, wherein the network server is adapted to transmit information over a wireless network via the base station to the low duty cycle wireless device when the low duty cycle wireless device awakes from a hibernation mode.

DETAILED DESCRIPTION

Figure 1:
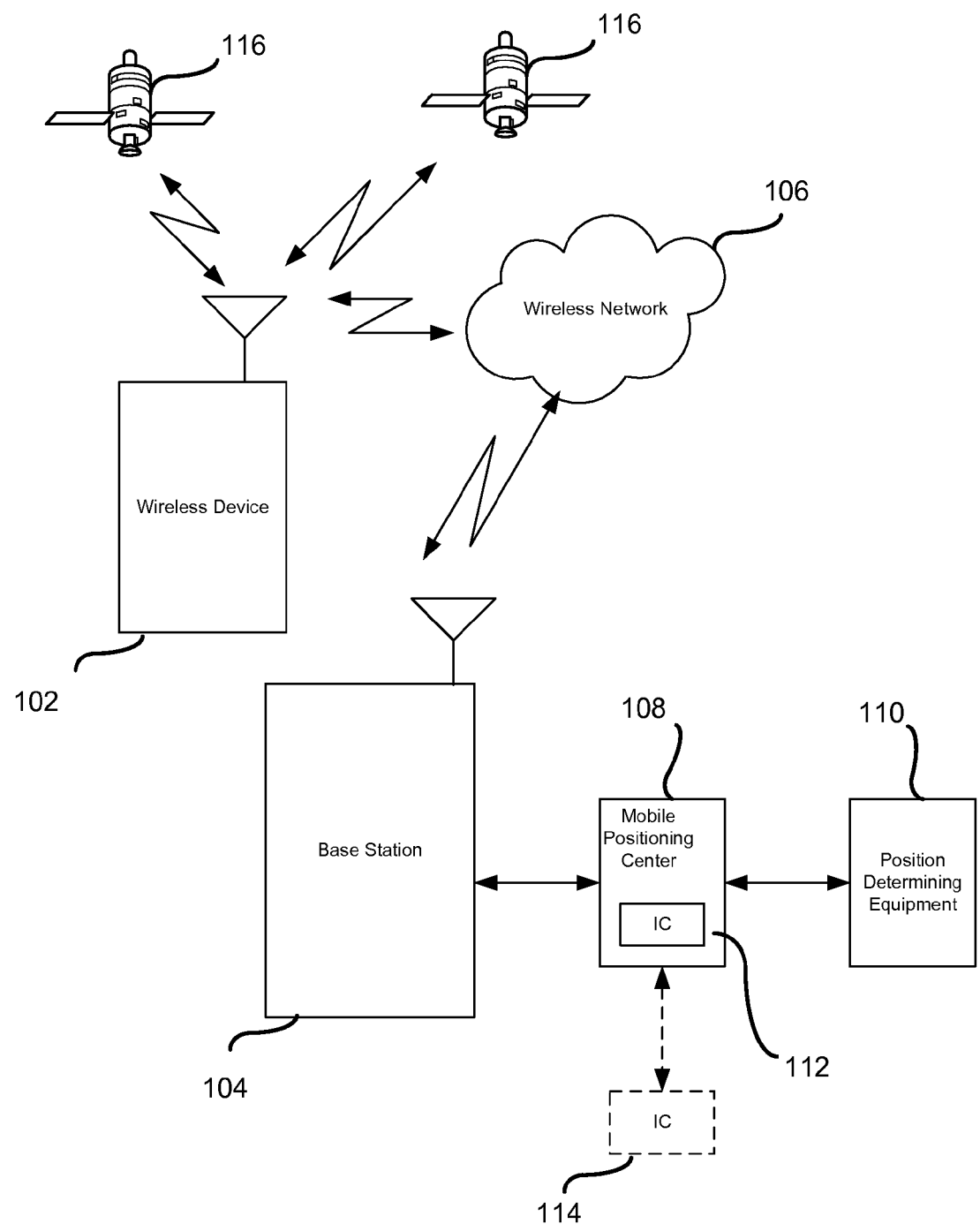
FIG. 1 is a simplified block diagram of a wireless network interconnecting a wireless device, a base station, a mobile positioning center, and position determining equipment in accordance with an exemplary embodiment of the technology of the present application.

The technology of the present application will now be explained with reference to the figures. While the technology of the present application will be described in particular reference to a mobile, wireless device using location or position information, one of ordinary skill in the art on reading the disclosure would now recognize that the technology may be used in other and different applications. Thus, while the exemplary embodiments described herein are associated with location or position based information, one of ordinary skill in the art would recognize on reading the disclosure that messages associated with location or position information could be messages regarding non location or position information, such as, for example, flow information, temperature information, battery charge, or the like. Moreover, the location or position information may be generated or estimated using a number of techniques on a number of different wireless networks including, for example, private and public networks, a WLAN, a WWAN, WiFi, WiMax, or the like. The communication protocols may include, for example, Code Division Multiple Access (CDMA) network protocols, Global System for Mobile Communications (GSM) network protocols, Time Division Multiple Access (TDMA) network protocols, Single-Carrier Frequency Division Multiple Access (SC-FDMA) network protocols, or the like. Additionally, the location or position information may be either a satellite based positioning system, a terrestrial based positioning system, or a hybrid positioning system as is generally known in the art. For example, a satellite based positioning system (SPS) may employ the Global Positioning System (GPS—originally titled NAVSTAR GPS when developed by the military). Of course, GPS is simply one example of an SPS and other SPSs may be used, such as, for example, other Global Navigation Satellite Systems (GNSS), Galileo positioning system (Europe), Glonass (Russian), Compass/Beidou (Chinese), QZSS (Japanese), a combination thereof, and the like.

Reference herein to location or position should be construed broadly and is provided in the alternative construction because some applications conventional in the art refer to location based services and some applications conventional in the art refer to position based services.

The technology of the present application will be described with reference to wireless devices having extended low duty, hibernation, sleep, or low power modes or cycles. The terms are used interchangeably and indicate non-essential functions of the wireless device are shut off or powered down to conserve battery power. In one exemplary embodiment, a wireless device in hibernation mode may not be capable of transmitting, receiving and/or processing signals transmitted over a wireless communication network. In another exemplary embodiment, in a low power mode, a wireless device may only provide power to a clock or timer to facilitate powering the device at a prescheduled time. Generally, speaking the technology of the present application is described with respect to hibernation for lower power operations and awake for higher power operations. High power operations is provided as the converse of a low power mode, and may include powering up a device sufficiently to allow transmitting, receiving, and processing signals.

The technology of the present application also will be described with reference to certain exemplary embodiments. The word "exemplary" is used herein to mean "serving as an example, instance, or illustration." Any embodiment described herein as "exemplary" is not necessarily to be construed as preferred or advantageous over other embodiments. Moreover, unless specifically identified as exemplary, any embodiment described should be considered exemplary.

Referring first to FIG. 1, a simplified block diagram illustrating an exemplary system 100 is provided. System 100 includes a wireless device 102 interconnected to a base station 104 through a wireless network 106. A mobile positioning center (MPC) 108 is connected to base station 104 and position determining equipment (PDE) 110 is connected to mobile positioning center 108. While the exemplary embodiment is described with relation to a MPC 108, MPC 108 may be any type of network server capable of transmitting and receiving information from the wireless device 102 via the base station 104 and MPC 108 is but one common example of such a network server. Wireless device 102, sometimes referred to as user equipment (UE) or the like, comprises, for example, a cellular telephone, a radio frequency identification unit, a personal digital assistant, a handheld computer, a laptop computer, or any wireless electronic device capable of providing information for or running a position or location based service. A radio frequency identification unit may be included in a cellular telephone, a MP3 Player, and other portable electronic devices. Base station 104 conventionally would include, for example, other components of system 100 that are not shown for convenience and simplicity, such other components include a base station tower (BST), a base station controller (BSC), a mobile switching center (MSC), and the like as are generally known in the art. An information or scheduling lnposelstartcontrollerlnposelend (IC) 112 may be co-located with MPC 108 as shown. Alternatively, information or scheduling controller 112 may be co-located with PDE 110 or reside in a separate application accessible by MPC 108 (as shown in phantom by stand alone information or scheduling controller 114). While shown with only one wireless device 102 connection to base station 104, one of ordinary skill in the art would recognize on reading the disclosure that system 100 may comprise a plurality of wireless devices connected to a plurality of base stations, etc.

According to one exemplary embodiment, the wireless device 102 may estimate its position or location based in part on signals received from satellites 116 associated with a SPS. Wireless device 102 may be configured to communication with MPC 108 and PDE 110 through an uplink portion of wireless network 106 through the associated base station 104 to request assistance concerning its location. MPC 108 and PDE 110 may transmit the requested information to the wireless device 102 through a downlink portion of wireless network 106 though base station 104. In one exemplary embodiment, such a downlink portion of a wireless communication network may include pilot channels providing beacon functionality for initial system acquisition, synchronization channels for carrying system parameters required at system acquisition, paging channels used to carry overhead messages, pages, setup messages and orders. Information transmitted to wireless device 102 in a downlink portion also may include, for example, commands to control and/or configure the wireless device 102 or the like. Other information in one exemplary embodiment may include identification of satellites currently in view and from which wireless device 102 may be able to receive information regarding the location of the in view satellites, correction factors, information regarding the Doppler shift to be expected, and the like as is generally known in the art. As will be explained further below, wireless device 102 may have an extended hibernation cycle where wireless device 102 may not be capable of receiving information from MPC 108, PDE 110 and associated applications or services.

Transmissions from MPC 108 over the downlink portion of system 100 may include commands to wireless device 102. The commands may include commands relating to altering the hibernation and awake schedule of wireless device 102. Altering the hibernation and awake schedule may include shortening the hibernation schedule, lengthening the hibernation schedule, or altering the start and end times, or the like, or some combination thereof. In one exemplary embodiment, the commands to alter the hibernation and awake schedule may be related to, for example, battery charge or the like. In this exemplary embodiment, the hibernation schedule may be extended due to a battery charge below a predetermined threshold, shortened due to a battery charge above a predetermined threshold. Another potential exemplary embodiment may extend the hibernation schedule because the device is stationary for a predetermined amount of time. Another potential exemplary embodiment may shorten the hibernation schedule due to perceived changes in the monitored information. Changes in the hibernation schedule may origination from wireless device 102, MPC 108, or a combination thereof.

In one exemplary embodiment of wireless device 102, user equipment associated with wireless device 102 may be capable of obtaining pseudorange measurements based on, for example, signals from satellites 116 at the device using techniques generally known in the art. Wireless device 102 and/or the associated user equipment may communicate with MPC 108 and PDE 110 to receive information to assist wireless device 102 and/or the associated user equipment to acquire signals from satellites 116. The location of wireless device 102 and/or the associated user equipment may be estimated based on the pseudorange measurements obtained from the acquired satellites 116.

Alternatively to estimating its location, wireless device 102 and/or the associated user equipment may transmit through an uplink via wireless network 106 and base station 104 the pseudorange measurements to PDE 110 or an application service as is generally known in the art.

Figure 2:
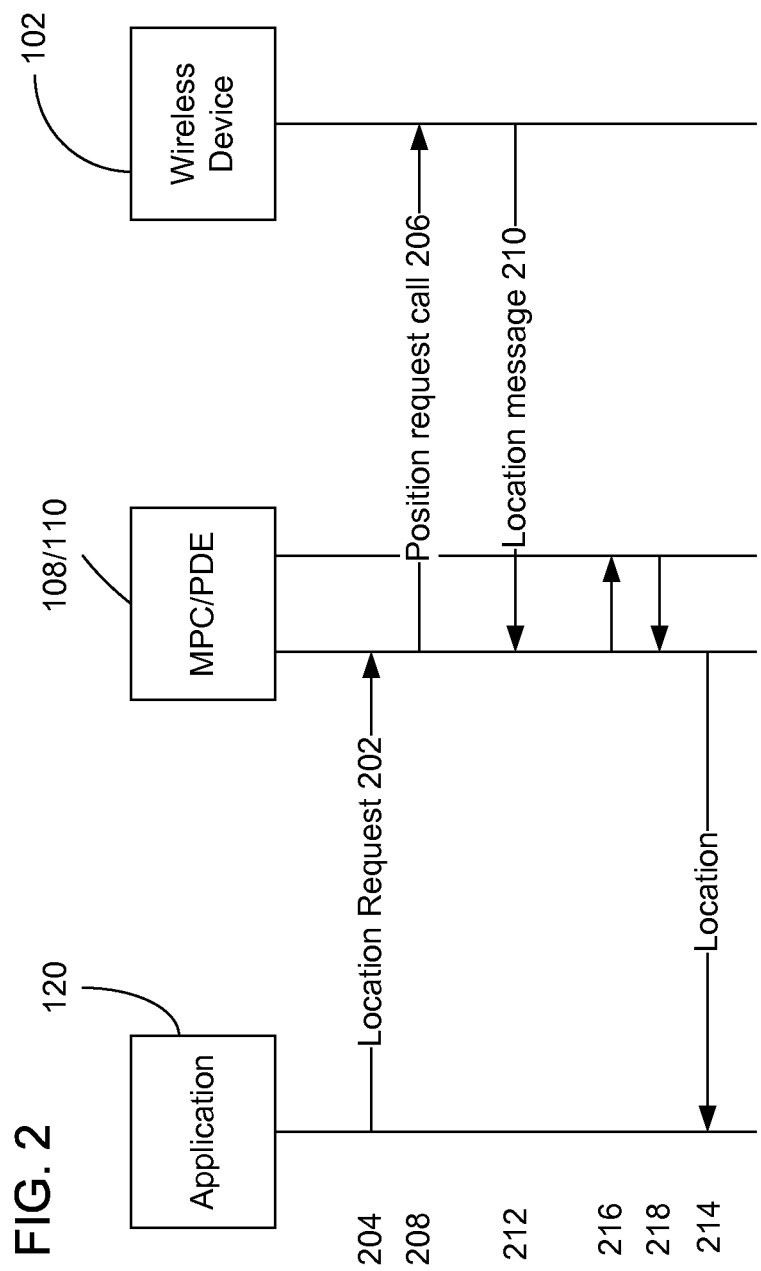
FIG. 2 is a diagram illustrating a call flow according to one aspect of the technology of the present application.

Referring now to FIG. 2, an exemplary illustration of data flow for a location request is provided. While described with respect to a location request, one of ordinary skill in the art would recognize on reading the present application that other requests, broadcasts, and transmissions to the wireless device 102 may follow a similar call flow. For example, an application may request temperature information from the wireless device instead of location information to name but one alternative information request. First, in this exemplary embodiment, an application 120 may initiate a location request (LR) 202 to wireless device 102 as is generally understood in the art at event 204. LR may be generically referred to as an information or data request herein. The LR 202 is received at MPC 108/PDE 110 that generates a position request call 206 to wireless device 102 at event 208. The position request call 206 may be stored in a memory, such as a cache, a buffer, a permanent or temporary memory, if MPC 108 determines wireless device 102 is incapable of receiving or processing transmissions, which will be explained further below. When wireless device 102 is capable of receiving and/or processing transmissions, the position request call 206 is made to wireless device 102 at event 208. The wireless device 102 receives the position request call 206 and returns a location message 210 at event 212. Location message 210 may contain the location (or an approximation of location) of the wireless device 102 or location message 210 may contain information needed to determine the location of wireless device 102. The location of wireless device 102 would be provided to application 120 at event 214.

If the location message 210 contains information necessary to determine the location of wireless device 102, MPC 108 may call PDE 110 at event 216 and transmit the location message and a request to compute the location of wireless device 102. PDE 110 would calculate location and return the location to MPC 108 at event 218. The location would than be transmitted to application 120 at event 214.

As identified above, the wireless device 102 may be a low duty cycle wireless device having extended hibernation periods and limited awake periods or cycles. The hibernation and awake schedule may be fixed, variable, or a combination thereof. If variable, scheduling subsequent awake times may be provided with configuration information during a current awake time when the wireless device 102 receives transmissions. Moreover, during times when device 102 is awake, it may be configured to operate in accordance with convention wireless network protocols. For example, in a CDMA network, the wireless device 102 may perform slotted mode operations such as listening to a paging channel, receiving messages, and sending messages. Thus, the wireless device 102 may transmit information to MPC 108 using an uplink portion of the system 100. Similarly, the wireless device 102 may receive information from MPC 108 using a downlink portion of the system 100.

In one exemplary embodiment, the wireless device 102 having an extended hibernation period may be configured to awaken in synchronization with the IC 112 incorporated with MPC 108 (or residing in an application separate from MPC 108 such as IC 114) as will be explained further below. The synchronization between the wireless device 102 and MPC 108/IC 112 may include transmitting and receiving a hibernation cycle, which may include, for example, time between consecutive wake ups, duration of awake periods, or the like. Wireless device 102 or IC 112 may alter the hibernation cycle depending on information from the wireless device 102. For example, if battery power for the wireless device 102 falls below one or more predetermined thresholds, the hibernation time may be extended a corresponding amount, such amount may be predetermined or calculated based on a predetermined formula or the like.

In certain exemplary embodiments, the wireless device 102 may register with IC 112 of MPC 108 (or separate application 114) when wireless device 102 is in an area supported by MPC 108. In this case, wireless device 102 during an awaken period would acquire a signal from base station 104 and exchange information with MPC 108 using techniques similar to those used for registering devices joining a cell, such as, for example, a cell of a CDMA network. As part of such a registration, wireless device 102 may indicate attributes, such as, for example, identification information, information indicating particular capabilities of wireless device 102, information specifying a hibernation mode schedule.

MPC 108 would use this information to, in one exemplary embodiment, trigger messages to the wireless device 102 that are pending for delivery. In some embodiments, for example, MPC 108 may extend the awaken time period or schedule to allow for transmission of all pending messages or requests.

MPC 108 in one exemplary embodiment may be configured to receive a signal from wireless device 102 indicating wireless device 102 is in an unscheduled awake period. During the unscheduled awake period, MPC 108 may transmit via a downlink to wireless device 102 pending messages and transmission for wireless device 102.

Figure 3:
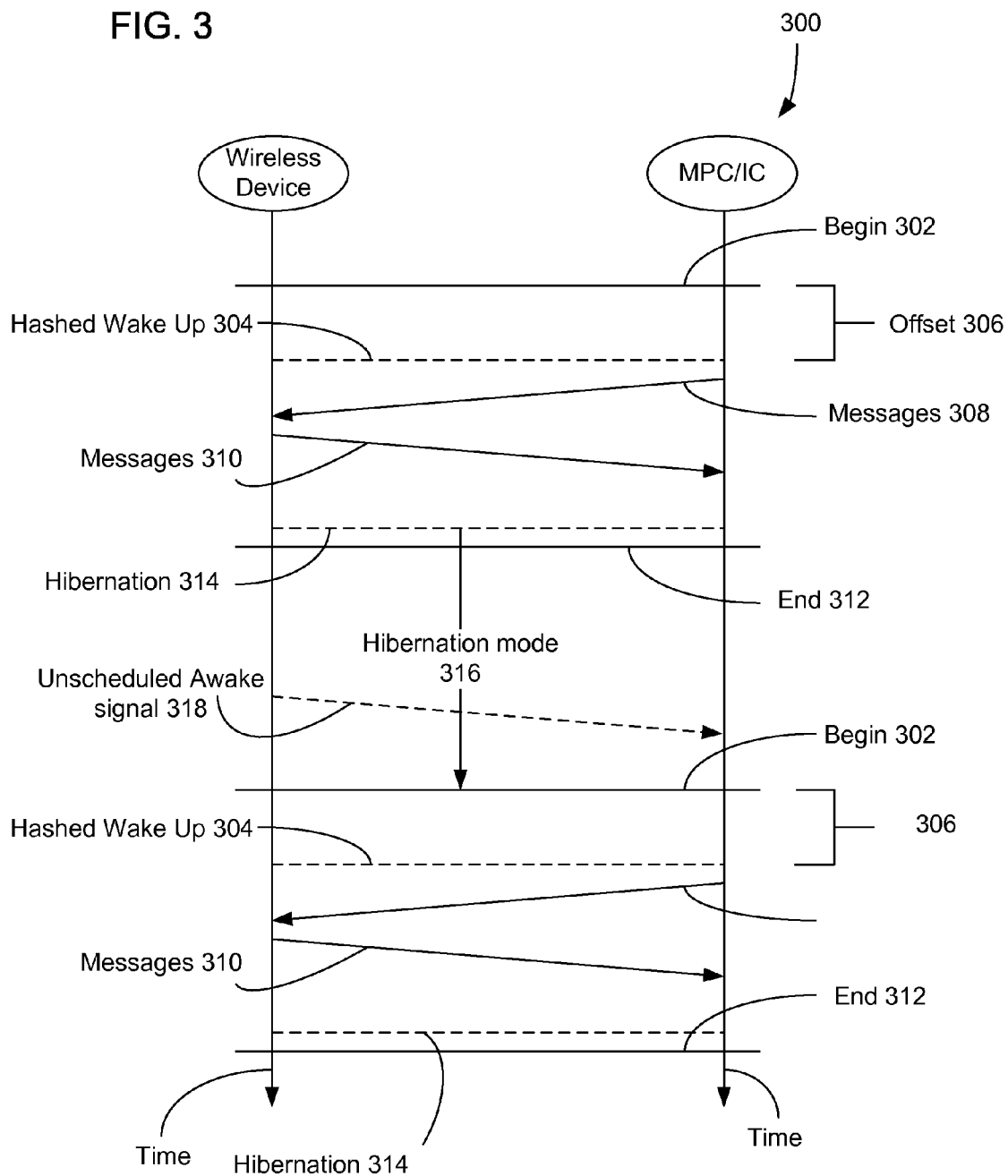
FIG. 3 is a diagram illustrating synchronization of scheduling of an awake and a hibernation mode of a wireless device and a mobile positioning center in one aspect of the technology of the present application.

As shown in FIG. 3, one exemplary timing diagram 300 for a transmission schedule is provided. Wireless Device 102 and MPC 108/IC 112 operation over time are provided with time represented by lines extending from the devices. As can be appreciated, a group of low duty cycle devices may be synchronized with MPC 108/IC 112. Thus, to even out the transmission, the low duty cycle devices would have a scheduled earliest awake time at begin time 302. Each particular wireless device would be schedule to awake at begin time 302 or a predetermined period after begin time 302, generally referred to as a hashed wake up time 304. Hashed wake up 304 would be known to both wireless device 102 and MPC 108/IC 112 such that after the offset 306 between begin time 302 and the hashed wake up 304, messages 308 would be broadcast to wireless device 102 from MPC 108. The offset 306, which may be different for each wireless device 102 scheduled to be awakened between begin time 302 and end time 312, may be formulated to distribute the actual wake up of each device substantially evenly over the interval defined by begin 302 and end 312. In one implementation, hashed wake up time 304 and offset 306 are determined by wireless device 102. In another implementation, hashed wake up time 304 and offset 306 are determined by IC 112. In still another implementation, hashed wake up time 304 and offset 306 are determined by a combination of wireless device 102 and IC 112. Wireless device 102 may similarly broadcast messages 310 to MPC 108. Note, while shown as MPC 108 first broadcasting to wireless device 102, wireless device may in some embodiments transmit to MPC 108 prior to MPC 108 transmitting to wireless device 102. Also, in some cases, MPC 108 and wireless device 102 may transmit substantially simultaneously over the full duplex network. Messages 308 and 310 would be broadcast until there are no further messages to be sent, at which time, wireless device 102 would enter hibernation mode 314. Finally, at end time 312, wireless device would enter the scheduled hibernation mode if hibernation mode 314 has not already been entered based on not receiving or transmitting any additional messages for a predetermined time. Notice, message 308 or message 310 may contain instructions to extend the awake time of wireless device 102 in response to certain other messages or in order to allow sufficient time to broadcast all messages. A message to not enter hibernation may also be referred to as a keep alive message or a KA message. While FIG. 3 shows but one example of a timing diagram for transmission including an extended hibernation schedule, other schedules are possible. MPC 108 may prioritize messages to be sent to wireless device 102 during the hibernation mode period as part of a transmission selection process as a matter of design choice. Additionally, any of messages 308 or 310 may include an extension time to extend the awake period to allow for transmission of all pending messages during the present awake period so messages do not need to be retained in memory from one awake period to the next.

On reaching hibernation 314 or end time 312 without a keep alive message 310 or message 308 being received, wireless device 102 would enter hibernation mode 316. Hibernation mode 316 would continue until the next scheduled awaken period as shown. In some embodiments, however, during the hibernation mode 316, wireless device 102 may transmit an unscheduled awake signal 318 to MPC 108/IC 112. The unscheduled awake signal 318 may cause MPC 108 to transmit any pending messages 308 and allow wireless device to transmit any pending messages 310. Receipt of an unscheduled awake signal 318 could be preprogrammed to provide a certain time associated with being active or awake. Alternatively, wireless device 102 and/or MPC 108 may transmit a configuration component in to provide indication of the duration of the unscheduled awake time.

Figure 4:
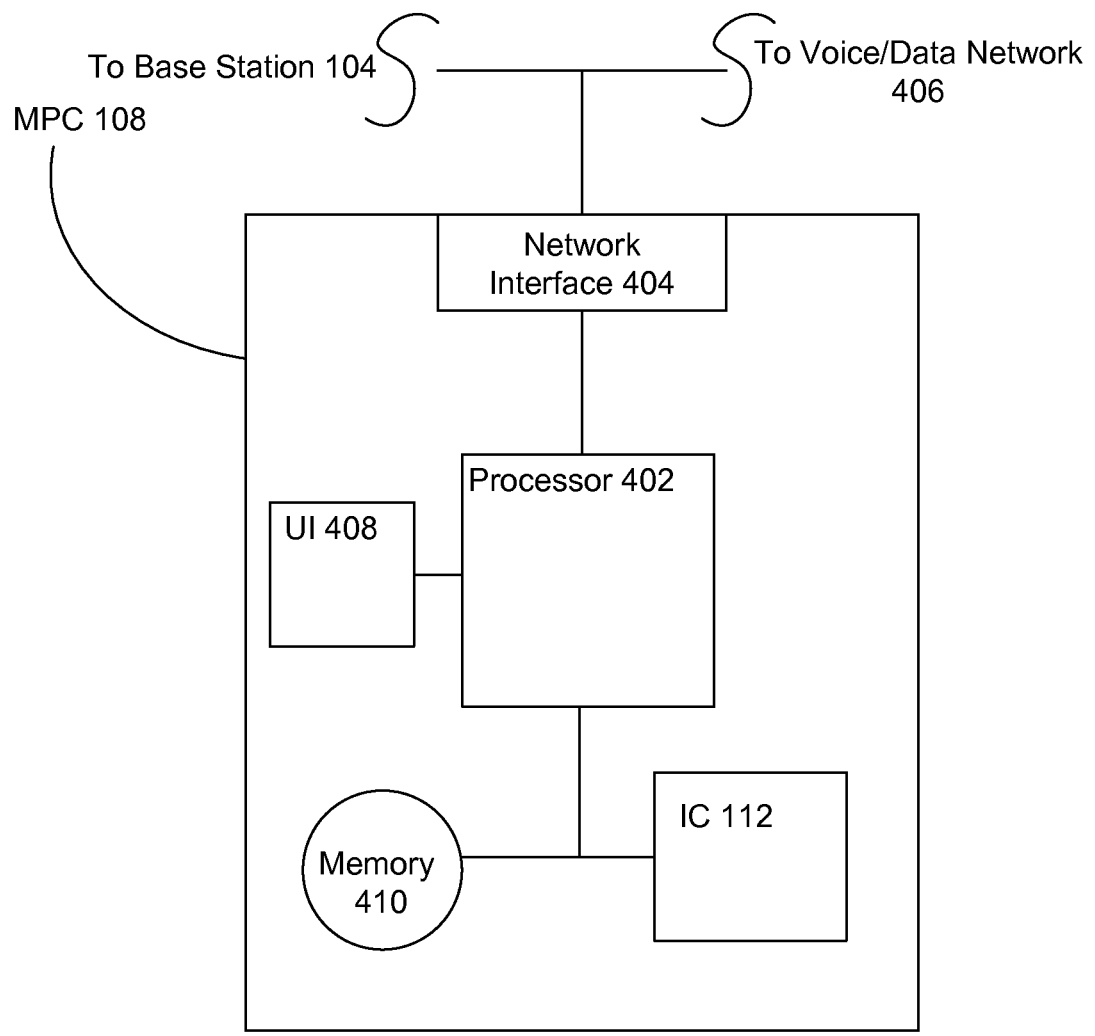
FIG. 4 is a functional block diagram illustrating portions of a mobile positioning center as it relates to the technology of the present application.

Referring now to FIG. 4, an exemplary functional block diagram of portions of MPC 108 relating to the technology of the present application is provided. The construction of MPC 108 is generally known in the art and will not substantially be reproduced herein. MPC 108 in an exemplary embodiment includes a processor 402. Processor 402 controls the computing functionality of MPC 108 to process many inputs and/or data as may be required for the operation of MPC 108. Processor 402 may be any conventional processor such as, for example, a conventional microprocessor, chipset, field programmable gate array logic, server, a conventional computer such as a laptop or desktop, or the like. MPC 108 has a network interface 404. Network interface 404 couples MPC 108 to base station 104 and a voice and/or data network 406. While shown as a single network interface 404, MPC 108 may have several network interfaces to connect to different types of networks as a matter of design choice. Connections between base station 104, voice/data network 406 and MPC 108 may be a wired or a wireless connection as a matter of design choice. MPC 108 may comprise a user interface (UI) 408. UI 408 may be any conventional interface, such as, for example, a visual display, a keyboard, a trackball, a mouse, a light pen, a graphical user interface, a microphone, a speaker, or a combination thereof. UI 408 may allow manual updates to schedule and configuration of the duty cycle associated with wireless device 102. Processor 402 also is interconnected with a memory 410. The memory 410 may store processing instructions to be executed by the processor 402. The memory 410 also may store the low duty cycle schedule associated with IC 112. IC 112 may be integrated with processor 402, a stand alone processor integrated into MPC 108 (as shown), or a remote application 114 (as shown in phantom in FIG. 1), accessible via a network interface 404. IC 112 may access the schedule, as explained in association with FIG. 3, to provide control signals for when MPC 108 can transmit and receive messages 308, 310 to and from one or more low duty cycle wireless devices such as wireless device 102.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A network server comprising:
   at least one network interface coupled to a base station;
   a processor coupled to the at least one network interface to receive and transmit signals to at least one low duty cycle wireless device through the base station, wherein the signals comprise location information and a scheduling message for adjusting hibernation and awake schedules based on the at least one low duty cycle wireless device being stationary for a predetermined amount of time; and
   an information or schedule controller to provide information to the processor indicating when the at least one low duty cycle wireless device is scheduled to be awake, wherein
   the network server transmits information over a wireless network via the base station to the at least one low duty cycle wireless device when the at least one low duty cycle wireless device is scheduled to awaken from a hibernation mode.

2. The network server of claim 1 wherein the network server is a mobile positioning center.

3. The network server of claim 1 wherein the information or schedule controller is integrated with the processor.

4. The network server of claim 1 wherein the information or schedule controller is remote from the network server.

5. The network server of claim 1 wherein the location information comprises pseudorange measurements.

6. The network server of claim 1 wherein the location information comprises information associated with a satellite positioning system.

7. The network server of claim 2 wherein the mobile positioning center is coupled to position determining equipment.

8. The network server of claim 1 wherein the network server transmits and receives information from the at least one low duty cycle wireless device according to a code division multiple access protocol.

9. The network server of claim 1 wherein the network server transmits and receives information from the at least one low duty cycle wireless device according to a global system for mobile communication protocol.

10. The network server of claim 1, wherein the network server receives unscheduled signals from the at least one low duty cycle wireless device indicating that the at least one low duty cycle wireless device is awake at an unscheduled time.

11. The network server of claim 1 comprising a memory to store information regarding a hibernation and awake schedule for the at least one low duty cycle wireless device.

12. The network server of claim 1 wherein the information or schedule controller determines a begin time and an end time for an awake mode for the at least one low duty cycle wireless device.

13. The network server of claim 12 wherein the information or schedule controller determines an offset defining a time between the begin time and a hashed wake up time for the at least one low duty cycle wireless device such that the awake mode for the at least one low duty cycle wireless device starts at the hashed wake up time.

14. The network server of claim 12 wherein the network server extends the duration of the awake mode beyond the end time to transmit a pending transmission message.

15. The network server of claim 1 wherein the information or schedule controller receives a begin time and an end time for an awake mode from the at least one low duty cycle wireless device.

16. The network server of claim 15 wherein the information or schedule controller receives an offset defining a time between the begin time and a hashed wake up time from the at least one low duty cycle wireless device such that the awake mode for the at least one low duty cycle wireless device starts at the hashed wake up time.

17. The network server of claim 12 wherein the begin time and the end time for the awake mode is based on information from the wireless device.

18. The network server of claim 15 wherein the begin time and the end time for the awake mode is based on information from the wireless device.

19. The network server of claim 1, wherein the scheduling message for adjusting hibernation and awake schedules is further based on a battery charge.

20. A method of transmitting and receiving messages at a network server from and to at least one low duty cycle wireless device, the method comprising:
scheduling an awake time for the at least one low duty cycle wireless device using a scheduling message, wherein the awake time is scheduled based on the at least one low duty cycle wireless device being stationary for a predetermined amount of time;
storing a transmission message for transmission to the at least one low duty cycle wireless device during the awake time; and
transmitting the stored transmission message for the at least one low duty cycle wireless device during the scheduled awake time.

21. The method of claim 20 wherein the network server is a mobile positioning center.

22. The method of claim 20 wherein the scheduling an awake time for at least one low duty cycle wireless device comprises operating an information or schedule controller to synchronize the awake time of the at least one low duty cycle wireless device and a mobile positioning center.

23. The method of claim 20 comprising receiving a reception message from the at least one low duty cycle wireless device.

24. The method of claim 20 comprising scheduling a hibernation time for the at least one low duty cycle wireless device.

25. The method of claim 24 comprising extending the awake time of the at least one low duty cycle wireless device beyond the scheduled hibernation time.

26. The method of claim 20 comprising receiving an unscheduled transmission from the at least one low duty cycle wireless device.

27. The method of claim 20 comprising storing the information or schedule of the at least one low duty cycle wireless device.

28. The method of claim 27 wherein the information or schedule of the at least one low duty cycle wireless device comprises at least one of an awake begin time, an awake end time, or an offset defining a time between a begin time and a hashed wake up time.

29. The method of claim 28 wherein the information or schedule of the at least one low duty cycle wireless device is based on information from the at least one low duty cycle wireless device.

30. The method of claim 20 further comprising determining an offset defining a time between a begin time and a hashed wake up time wherein the at least one low duty cycle wireless device will receive transmissions at the hashed wake up time.

31. The method of claim 20, wherein the awake time is scheduled further based on a battery charge.

32. A non-transitory computer-readable medium containing computer executable code stored on a computer readable storage medium that cause a computer to:
schedule an awake time for at least one low duty cycle wireless device using a scheduling message, wherein the scheduling message adjusts hibernation and awake schedules based on the at least one low duty cycle wireless device being stationary for a predetermined amount of time;
store a transmission message for transmission to the at least one low duty cycle wireless device during the awake time; and
transmit the stored transmission message for the at least one low duty cycle wireless device during the scheduled awake time such that the at least one low duty cycle wireless device may have an extended hibernation mode.

33. The non-transitory computer-readable medium of claim 32 further comprising executable code to synchronize the awake time of a mobile positioning center and the at least one low duty cycle wireless device.

34. The non-transitory computer-readable medium of claim 32 further comprising executable code to receive a reception message from the at least one low duty cycle wireless device.

35. The non-transitory computer-readable medium of claim 32 further comprising executable code to extend a duration of the awake time of the at least one low duty cycle wireless device.

36. The non-transitory computer-readable medium of claim 34 wherein the code to receive a reception message further comprises code to receive a reception message during unscheduled awake times.

37. The non-transitory computer-readable medium of claim 32 further comprising executable code to determine at least one of an awake begin time, an awake end time, and an offset defining a time between a begin time and a hashed wake up time.

38. The non-transitory computer-readable medium of claim 32, wherein the scheduling message for adjusting hibernation and awake schedules is further based on a battery charge.

39. A network server comprising:
means for connecting a mobile positioning center to a base station;
means for transmitting signal to and receiving signals from a low duty cycle wireless device through the base station;
means for scheduling the transmission to the low duty cycle wireless device to synchronize the transmission of signals with a time when the low duty cycle wireless device is awake, wherein the mobile positioning center transmits information over a wireless network via the base station to the low duty cycle wireless device when the low duty cycle wireless device awakes from a hibernation mode and further wherein scheduling is performed with a scheduling message that adjusts hibernation and awake schedules based on the low duty cycle wireless device being stationary for a predetermined amount of time.

40. The network server of claim 39, wherein the scheduling message for adjusting hibernation and awake schedules is further based on a battery charge.

* * * * *